United States Patent
Bandyopadhyay

(10) Patent No.: US 6,950,581 B2
(45) Date of Patent: Sep. 27, 2005

(54) OPTICAL COUPLER APPARATUS AND METHODS HAVING REDUCED GEOMETRY SENSITIVITY

(75) Inventor: Anirban Bandyopadhyay, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 10/200,729

(22) Filed: Jul. 22, 2002

(65) Prior Publication Data

US 2004/0013357 A1 Jan. 22, 2004

(51) Int. Cl.[7] .............................................. G02B 6/26
(52) U.S. Cl. .............................. 385/42; 385/30; 385/50
(58) Field of Search .............................. 385/42, 41, 30, 385/39, 50, 14, 46

(56) References Cited

U.S. PATENT DOCUMENTS

| | | | |
|---|---|---|---|
| 4,026,632 A | | 5/1977 | Hill et al. |
| 4,142,775 A | | 3/1979 | Ramaswamy et al. ... 350/96.14 |
| 4,756,587 A | | 7/1988 | Sano et al. ............... 350/96.12 |
| 4,799,749 A | * | 1/1989 | Borner et al. ................. 385/14 |
| 5,265,177 A | * | 11/1993 | Cho et al. ...................... 385/14 |
| 5,502,781 A | * | 3/1996 | Li et al. .......................... 385/4 |
| 5,577,141 A | * | 11/1996 | Adar et al. .................... 385/43 |
| 5,719,976 A | | 2/1998 | Henry et al. .................. 385/50 |
| 6,360,047 B1 | * | 3/2002 | Nekado et al. ............. 385/129 |
| 6,434,296 B1 | * | 8/2002 | Lupu et al. .................. 385/30 |
| 6,633,705 B2 | * | 10/2003 | Ambrosy et al. ............. 385/43 |

FOREIGN PATENT DOCUMENTS

| | | | |
|---|---|---|---|
| EP | 1118888 | 7/2001 | ............ G02B/6/27 |
| JP | 01-097905 | 4/1989 | ............ G02B/6/12 |
| JP | 10-186153 | 7/1998 | ............ G02B/6/122 |

* cited by examiner

*Primary Examiner*—Rodney Bovernick
*Assistant Examiner*—Mike Stahl
(74) *Attorney, Agent, or Firm*—Schwegman, Lundberg, Woessner & Kluth, P.A.

(57) ABSTRACT

Optical coupler apparatus having reduced geometry sensitivity includes spaced apart first and second main waveguides having a coupling section. In one embodiment, first and second side waveguide sections are arranged in the coupling section adjacent outer sides of the first and second main waveguides to allow evanescent coupling between the main waveguides and side waveguide sections. Methods of fabrication and operation are also described.

27 Claims, 4 Drawing Sheets

US 6,950,581 B2

OPTICAL COUPLER APPARATUS AND METHODS HAVING REDUCED GEOMETRY SENSITIVITY

TECHNICAL FIELD

The field of the invention relates to optical couplers, and in particular relates to optical couplers having reduced geometry sensitivity.

BACKGROUND INFORMATION

Optical couplers are key components in optical networks. Optical couplers are used for routing signals from one waveguide to another and/or for splitting optical signals into two independent signals at a predetermined power ratio to be transmitted over two different waveguides. The most common and widely used form of optical coupler is the "evanescent coupler." Advantages of such couplers include small size and low insertion loss.

FIG. 1 is a plan view of a prior art optical coupler 10. In a planar optical circuit, a conventional evanescent optical coupler 10 is formed on a substrate 12 by laying out two waveguides 14 and 16 having respective input ends 18 and 20 and respective output ends 22 and 24. Waveguides 14 and 16 include respective core regions 34 and 36 ("cores") surrounded by a cladding region 40 ("cladding"). Coupler 10 includes a straight section 46 wherein waveguides 14 and 16 are parallel and separated by a small distance $\Delta X$, which typically is on the order of a few microns. Coupler 10 includes input and output sections 50 and 52 as well as bend sections 60 and 62 formed in waveguides 14 and 16 to provide separations S1 and S2 between the waveguides at the input and output sections. Separations S1 and S2 and bend sections 60 and 62 are such that optical coupling only occurs between the waveguides in straight section 46.

In the operation of optical coupler 10, a lightwave 70 is inputted to and guided by one of the waveguides, say waveguide 14. The optical power (power) in lightwave 70 is not confined to within waveguide core 34 but extends into the surrounding cladding 40 with a power distribution that drops off exponentially with distance from the core. This power is referred to as the "evanescent tail" or "evanescent wave." The maximum distance from core 30 where the evanescent tail can be practically sensed is referred to herein as the "coupling distance," which is a function of the difference in the refractive indices between the core 30 and the cladding 40, as well as the transverse dimension of the core 30.

In straight section 46, waveguide 16 is within the coupling distance of waveguide 14, so that optical power is coupled from waveguide 14 to waveguide 16 via the evanescent tail of lightwave 70. The amount of power coupled from waveguide 14 to waveguide 16 is a periodic function of the distance along the propagation direction (i.e., the Z-direction). The amount of coupled power for a fixed distance along the Z-axis is a strong function of the "geometry" of the coupler 10, i.e., the distance $\Delta X$ separating waveguides 14 and 16 and the difference $\Delta N$ in the refractive indices between the core 30 and the cladding 40.

One of the most important applications of an optical coupler 10 involves splitting input lightwave 70 equally between waveguides 14 and 20 So that equal amounts of optical power are outputted from waveguides 14 and 16 at output section 52. This is known as "3 dB (decibel) coupling," and such a coupler is referred to as a "3 dB coupler." Unfortunately, it is very difficult to make a true 3 dB coupler because the degree of coupling is very sensitive to the coupler geometry. For example, a conventional 3 dB optical coupler requires a refractive index difference $\Delta N$ within four parts in ten-thousand of the design value to achieve a power split within 2% of true 3 dB coupling. A consequence of not achieving 3 dB coupling to within the design specification is that the residual power can produce cross-talk, which reduces the performance of the optical network.

DETAILED DESCRIPTION

In the following detailed description of the invention, reference is made to the accompanying drawings that form a part hereof, and in which is shown by way of illustration specific embodiments in which the invention may be practiced. These embodiments are described in sufficient detail to enable those skilled in the art to practice embodiments of the invention, and it is to be understood that other embodiments may be utilized and that changes may be made without departing from the scope of the present invention. The following detailed description is, therefore, not to be taken in a limiting sense, and the scope of embodiments of the present invention is defined only by the appended claims.

Figure 1:
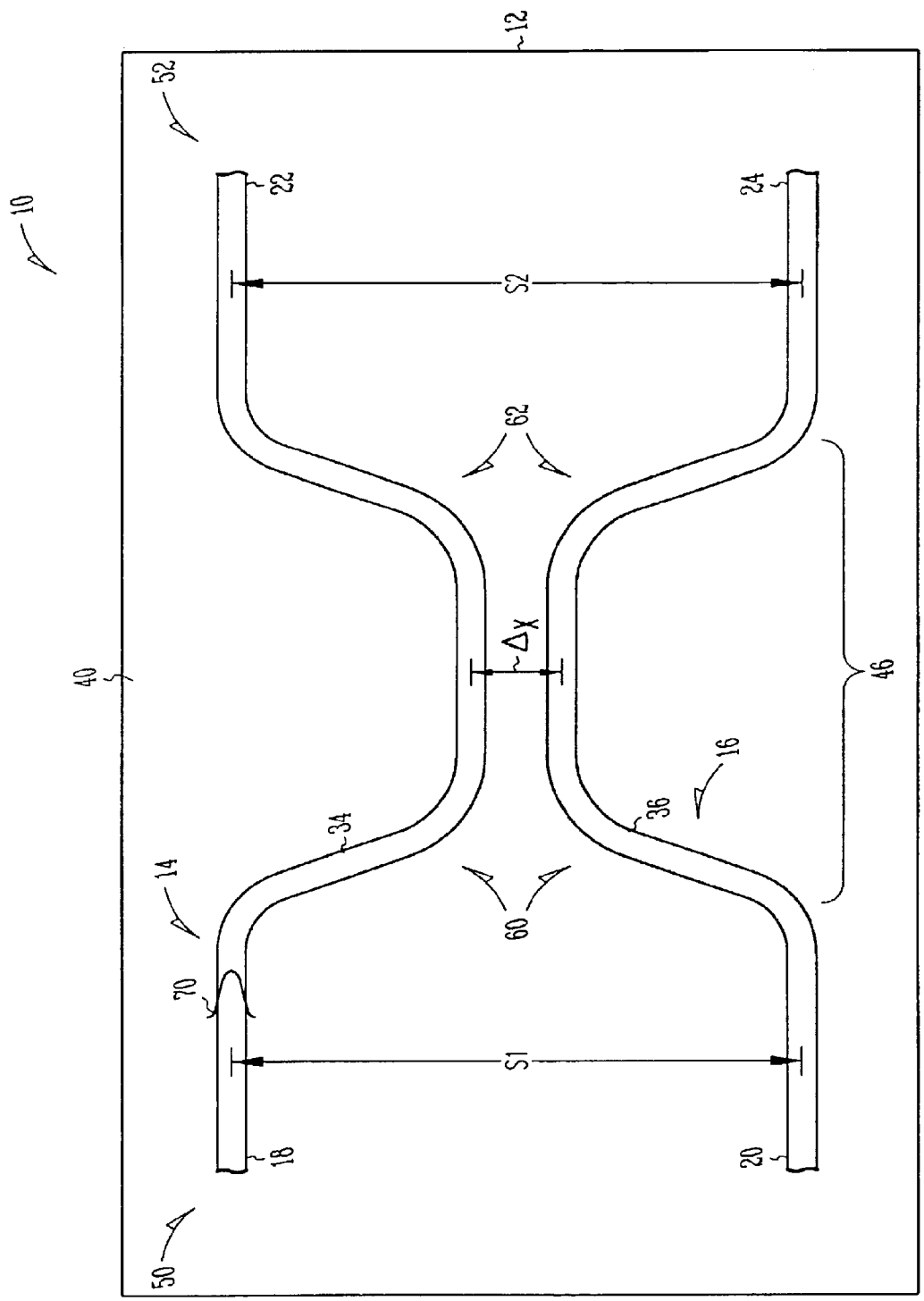
FIG. 1 is a plan view of a prior art integrated optical coupler.
Figure 2:
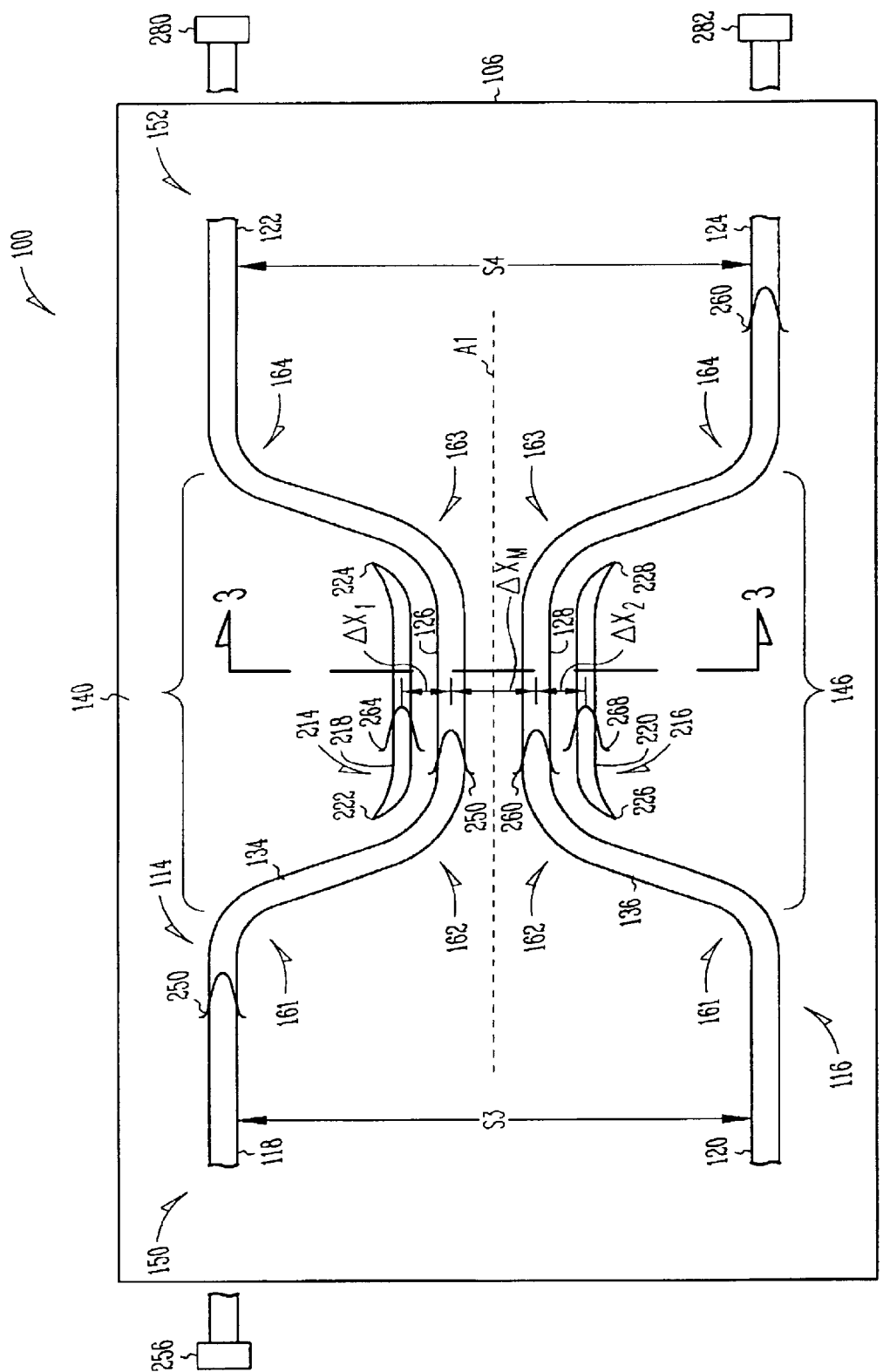
FIG. 2 is a plan view of an integrated optical coupler in accordance with an embodiment of the present invention.

FIG. 2 is a plan view of an integrated optical coupler 100 in accordance with an embodiment of the present invention. Optical coupler 100 is formed on a substrate 106.

Figure 3:
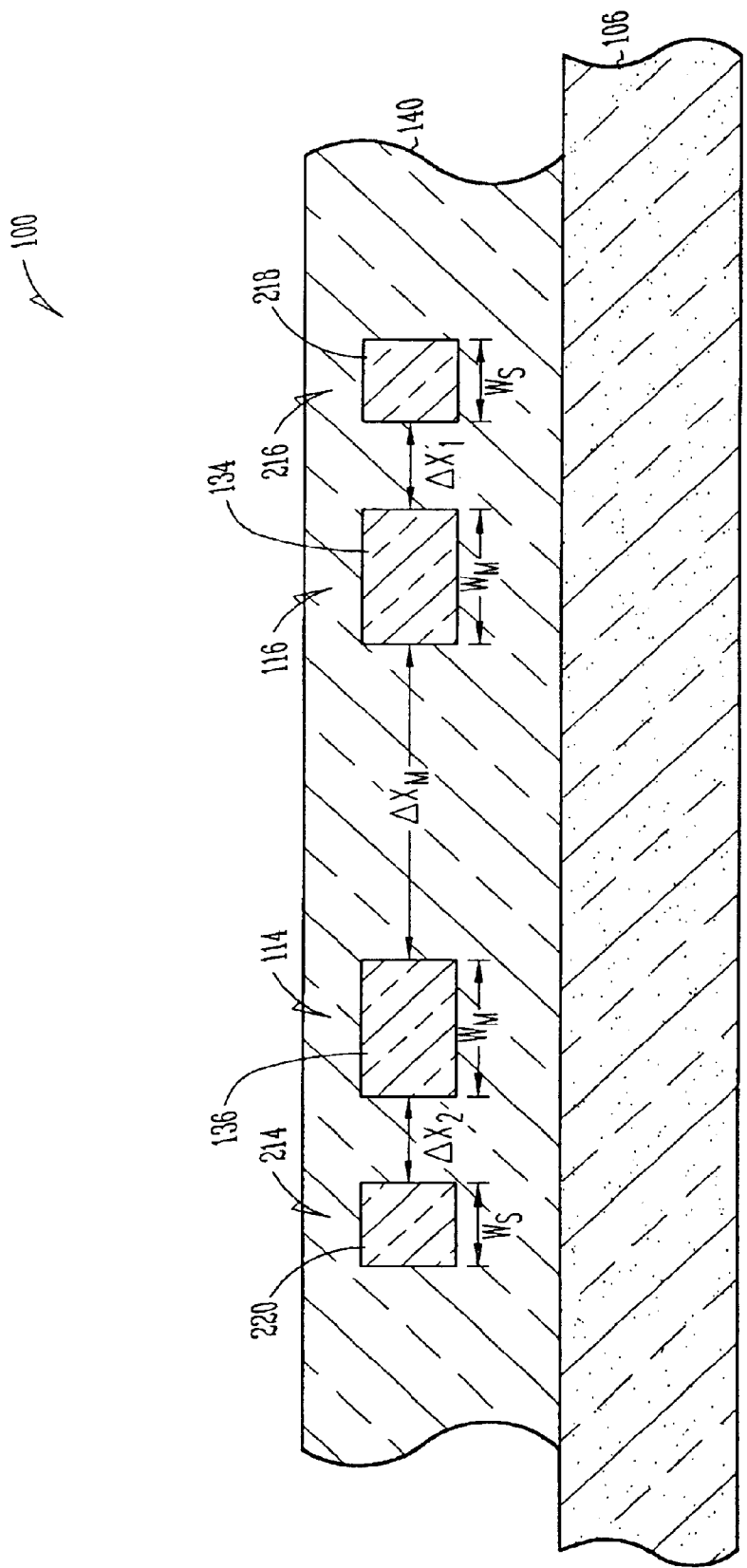
FIG. 3 is a cross-sectional view of the optical coupler shown in FIG. 2 taken along the line 3—3.

FIG. 3 is a cross-sectional view of the optical coupler shown in FIG. 2 taken along the line 3—3.

Referring now to FIGS. 2 and 3, optical coupler 100 includes two main waveguides 114 and 116 on either side of an axis A1. Waveguides 114 and 116 have respective input ends 118 and 120, and respective output ends 122 and 124. Waveguides 114 and 116 also have respective outer sides 126 and 128. Waveguides 114 and 116 include respective core regions 134 and 136 ("cores") surrounded by a cladding region 140 ("cladding"). Strictly speaking, waveguides 114 and 116 are defined by cores 134 and 136 and a small portion of cladding 140 surrounding each core. However, for the sake of illustration, it is assumed below that the waveguides have a dimension and shape essentially the same as that of the waveguide cores.

In an example embodiment, cladding 140 is a single layer deposited atop the substrate and that surrounds core regions 134 and 136. In an example embodiment, cladding 140 is a low-index material, such as a thermal oxide of silica having, for example, a refractive index of 1.445 at a wavelength of 1.55 microns. Further in the example embodiment, cores 134 and 136 are formed from doped silica, such as germanium-doped silica, having a refractive index of 1.455 at a wavelength of 1.55 microns.

Coupler 100 includes a coupling section 146 wherein main waveguides 114 and 116 are parallel and separated by a center-to-center distance $\Delta X_M$ such that waveguides are evanescently coupled. The optimal distance $\Delta X_M$ depends on a number of parameters, such as the wavelength of light traveling in the waveguides, the indices of refraction of the cores and cladding, and the width of the waveguides. In an example embodiment, distance $\Delta X_M$ is between 4 and 8 microns. Evanescent coupling allows power carried by a first lightwave 250 in one waveguide 114 to be transferred to the adjacent waveguide 116 to travel therein as a second lightwave 260, as discussed further below.

Coupler 100 further includes input and output sections 150 and 152 on either side of coupling section 146. Bends 161, 162, 163 and 164 in waveguides 114 and 116 provide a separation S3 between the waveguides at the input section and a separation S4 at the output section. The separations S3 and S4 are such that optical coupling only occurs between the waveguides in coupling section 146. In an example embodiment, a portion of bends 162 and 163 are included in coupling section 146.

Optical coupler 100 further includes side waveguide sections 214 and 216 each having respective cores 218 and 220. The cores are surrounded by cladding 140. Side waveguide sections 214 and 216 are respectfully located adjacent outer sides 126 and 128 of main waveguides 114 and 116 in coupling section 146. Side waveguide section 214 has first and second ends 222 and 224, and side waveguide section 216 has first and second ends 226 and 228. The side waveguide sections are separated from the main waveguides by center-to-center distances $\Delta X_1$ and $\Delta X_2$, respectively. In an example embodiment, $\Delta X_1 = \Delta X_2$. The distances $\Delta X_1$ and $\Delta X_2$ are such that main waveguide 114 and side waveguide section 214 are evanescently coupled, and main waveguide 116 and side waveguide section 216 are evanescently coupled. In an example embodiment, distances $\Delta X_1$ and $\Delta X_2$ are between 3 and 6 microns.

With specific reference to FIG. 3, in an example embodiment, the average width $W_S$ of side waveguide sections 214 and 216 is less than the average width $W_M$ of main waveguides 114 and 116. Here, average widths are used because the actual widths of the main waveguides and the side waveguide sections can vary slightly due to a variety of factors, such as variations in the process used to fabricate the optical coupler 100. In an example embodiment, the processes for fabricating optical coupler 100 are the same as or are similar to the processes used to fabricate integrated circuits. It is well known that such processes have a number of parameters (e.g., exposure dose, photoresist sensitivity, mask errors, etch sensitivity, and substrate flatness, just to name a few) that can vary slightly, resulting in a device geometry that varies from the design geometry. As explained in greater detail below, a purpose of side waveguide sections 214 and 216 is to make the optical power coupled out of one or both of the main waveguides less sensitive to variations in the geometry of the optical coupler.

Referring again to FIG. 2, in an example embodiment, first and second ends 222 and 224 of side waveguide section 214, and first and second ends 226 and 228 of side waveguide section 216, are tapered. A waveguide taper serves to enhance evanescent coupling by forcing the light into the adjacent waveguide when the light interacts with the taper. A further advantage of tapered waveguide ends is to minimize scattering loss. In a preferred embodiment, the tapered ends are such that the coupling is adiabatic, i.e., occurs with minimal or no loss in power when light is coupled into and out of the tapered ends of the waveguides.

Further in an example embodiment, first and second ends 222 and 224 of side waveguide section 214, and first and second ends 226 and 228 of waveguide 216, extend beyond the straight portions of the main waveguides in coupling section 146 and curve to follow the shape of the main waveguides. This extends the distance over which light is coupled from the main waveguides into the side waveguide sections.

In an example embodiment, optical coupler 100 operates as follows. An input lightwave 250 is input into main waveguide 114 at input end 118. In an example embodiment, lightwave 250 is generated by a light source 256 coupled to main waveguide 114 at input end 118, or upstream therefrom, as shown. When input lightwave 250 reaches coupling section 146, a portion of the input lightwave 250 begins to evanescently couple to main waveguide 116 and travel therein as lightwave 260, while a smaller portion of the input lightwave 250 begins to evanescently couple to side waveguide section 214 and travels therein as lightwave 264.

Further, as lightwave 250 travels in main waveguide 116, a portion of this lightwave is evanescently coupled to side waveguide section 216 and travels therein as lightwave 268. Toward the opposite end of the coupling section, lightwaves 264 and 268 traveling in side waveguide sections 214 and 216 are coupled back into main waveguides 114 and 116 and recombined with lightwaves 250 and 260. Lightwaves 250 and 260 then exit their respective waveguides at output end 152.

Light outputted from waveguide 114 is received and detected by a photodetector 280 arranged at output section 152 of waveguide 114 or alternatively, arranged downstream therefrom. Likewise, light outputted from waveguide 116 at output end 124 is received and detected by a photodetector 282 arranged at output end 152 of waveguide 116 or alternatively, arranged downstream therefrom. In an example embodiment, optical coupler 100 is designed as a 3 dB coupler, wherein 50% of the power in input lightwave 250 originally inputted to main waveguide 114 is coupled to main waveguide 116 as lightwave 260.

The amount of power coupled to side waveguide sections 214 and 216 in coupling section 146 increases or decreases with the variation in the refractive indices of the core and cladding materials and/or the width of the cores, in amounts corresponding to the power coupled between main waveguides 114 and 116. The total variation in output power from one main waveguide due to the variations in the geometry of the waveguides (e.g., the variation in refractive indices of the cores and cladding, and the variation in width of the waveguide cores) is partitioned between the other main waveguide and the side waveguide sections. Thus, the power in input lightwave 250 is divided between the main waveguides 114 and 116 in a ratio much less sensitive to variations in the optical coupler 100 geometry.

In practice, side waveguide sections 214 and 216 are formed using the same processes that form main waveguides 114 and 116. Consequently, the variations in the geometry of the main waveguides due to fabrication process variations are also present in corresponding amounts in the side waveguide sections. This provides a balancing action to any unevenness in the power coupled between the main waveguides that otherwise would arise from the coupler geometry being less than ideal.

Figure 4:
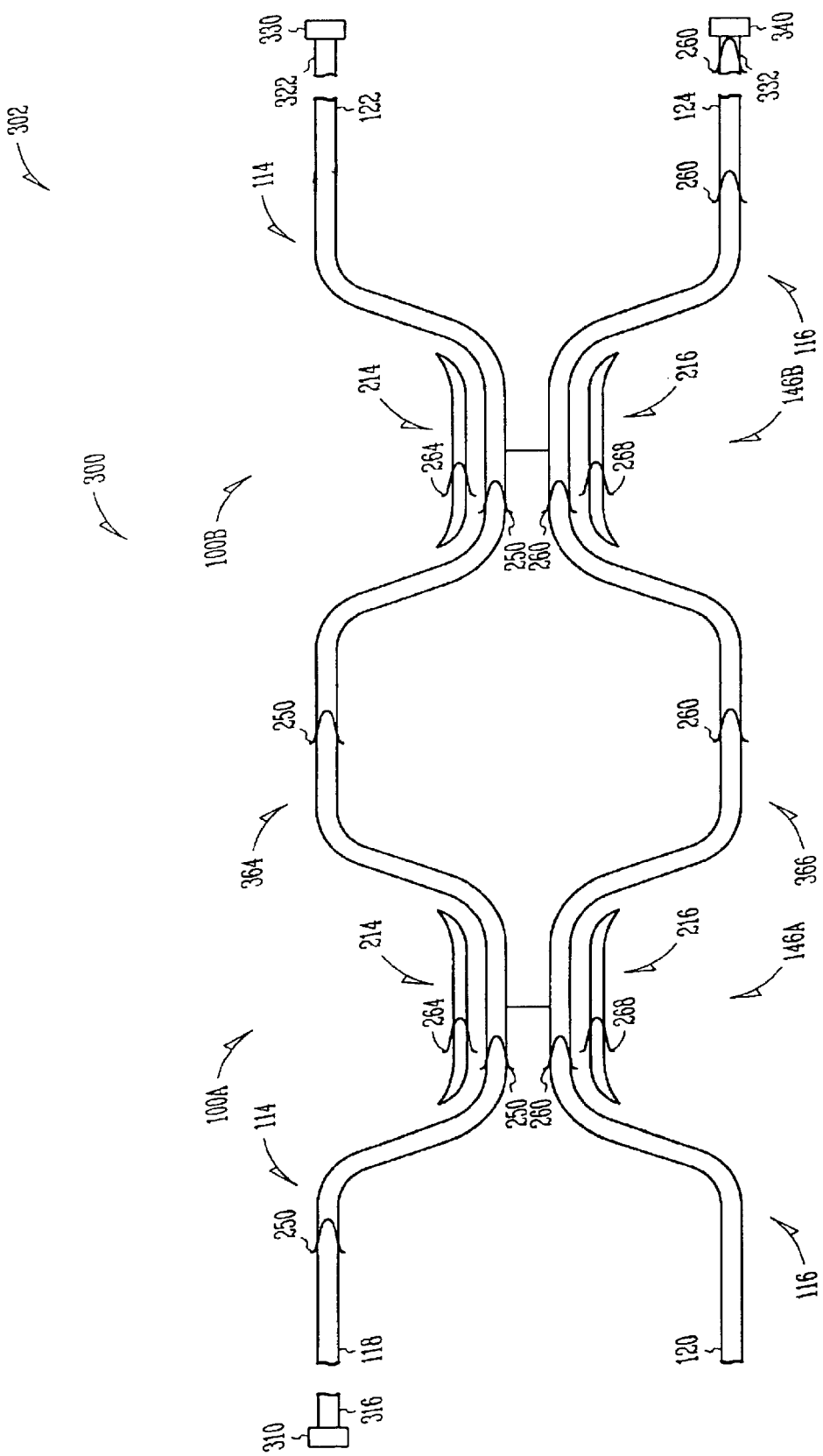
FIG. 4 is a plan view of an optical network that utilizes two of the optical couplers illustrated in FIG. 2, in accordance with an embodiment of the present invention.

FIG. 4 is a plan view of an optical network 302 that utilizes two of the optical couplers of FIG. 2, in accordance with an embodiment of the present invention. Mach Zehnder interferometer (MZI) apparatus 300 is shown as part of optical network 302. Optical network 302 includes a light source 310 coupled to one end of a first length of optical fiber 316, which is coupled at its opposite end to input end 118 of main waveguide 114. In an example embodiment, light source 310 includes a diode laser. Optical network 302 further includes a second length of optical fiber 322 coupled at a first end to output end 122 of main waveguide 114, and at its opposite end to a photodetector 330. In addition, optical network 302 includes a third length of optical fiber 332 coupled at a first end to output end 124 of main waveguide 116, and at its opposite end to a photodetector 340.

Waveguides 114 and 116 include respective sections 364 and 366 between the coupling sections 146A and 146B. Sections 364 and 366 serve as the interferometer arms. Coupling sections 146A and 146B each include a pair of side waveguide sections 214 and 216. If there is no phase difference between the two arms and if couplers 100A and 100B are perfect 3 dB couplers, then optical coupler 100A couples half of the power in lightwave 250 traveling in waveguide 114 into waveguide 116 to form lightwave 260. Optical coupler 100B then couples the remaining power in lightwave 250 into waveguide 116. Further, power is coupled into and out of side waveguide sections 214 and 216 in each of couplers 100A and 100B. Thus, essentially all of the power inputted into waveguide 114 as lightwave 250 exits waveguide 116 at output end 124 as lightwave 260.

As mentioned above, in the absence of side waveguide sections 214 and 216, if the optical coupler geometry differs from the ideal design geometry, the evanescent coupling between the main waveguides 114 and 116 is adversely affected. In a conventional Mach-Zehnder integrated optical interferometer, one possible result is that the transfer of power from waveguide 114 to waveguide 116 is incomplete so that some power remains in waveguide 114. In such case, the actual optical power outputted at output ends 122 and 124 differs from the desired (e.g., ideal) optical power output of the ideal design geometry. A non-ideal power output can result in undesirable cross-talk in the optical network.

However, as discussed above, the process variations that affect the geometry of the main waveguides also affect side waveguide sections 214 and 216 in optical couplers 100A and 100B. Thus, the corresponding variation of power coupled to the side waveguide sections reduces the overall variation in power coupled between the main waveguides. The side waveguide sections thus enable MZI apparatus 300 to provide an optical power output closer to a desired (e.g., the ideal design) optical power output as compared to the output in the absence of the first and second side waveguide sections. The side waveguide sections also make it easier to fabricate an MZI apparatus that operates within a particular design specification, e.g., having at least 99% of the output power being outputted from main waveguide 116 when all of the optical power is originally inputted into waveguide 114 at input end 118.

Polarization sensitivity is also an important performance parameter for optical components and subsystems in telecommunication systems, including optical couplers. The light incident on any subsystem of optical networks may have a random polarization that might change with different signals coming from different sources and distances. Hence, it is important that optical performance remain insensitive to the polarization of the incoming light.

The same is true for 3 dB couplers. It is known that the power split at the output of the couplers changes with polarization. The main contribution to this polarization dependence comes from the birefringence of the waveguide materials. In silica-on-silica technology, the fundamental mode for TM polarization is less confined to the core than the TE polarization if the material stress is compressive. Typical value of polarization-dependent power split for silica based couplers is about 0.5–0.7 dB.

For the same material birefringence ($\sim 5\times10^{-4}$), optical coupler 100 shows a 0.3 dB less polarization dependence than a conventional coupler. The reduced polarization dependence comes from the reduced sensitivity of the structure to a refractive index change. When the material index of the guiding layers is different for the TE and TM mode, it effects both the main waveguides as well as the side waveguides. Hence, the overall variation of coupling between the two main waveguides due to change in polarization is less for the new coupler.

The various elements depicted in the drawings are merely representational and are not drawn to scale. Certain proportions thereof may be exaggerated, while others may be minimized. The drawings are intended to illustrate various implementations of the invention, which can be understood and appropriately carried out by those of ordinary skill in the art.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An apparatus comprising:
   first and second main waveguides having input and output sections on either side of a coupling section, the first and second main waveguides being substantially parallel in the coupling section and being separated by a center-to-center distance to allow evanescent coupling between the first and second main waveguides in the coupling section; and
   first and second side waveguide sections in the coupling section adjacent respective outer sides of the first and second main waveguides to allow evanescent coupling between the first main waveguide and the first side waveguide section and between the second main waveguide and the second side waveguide section.

2. The apparatus of claim 1, wherein the first and second side waveguide sections each have first and second tapered ends.

3. The apparatus of claim 1, wherein the first and second main waveguides have a first average width, the first and second side waveguide sections have a second average width, and wherein the first average width is greater than the second average width.

4. The apparatus of claim 1, wherein the first and second main waveguides and the first and second side waveguide sections each have a core, and wherein the cores are surrounded by a cladding layer formed atop a substrate.

5. The apparatus of claim 4, wherein the cladding includes silica and the cores each include doped silica.

6. The apparatus of claim 1, wherein the first and second main waveguides are arranged to form a Mach-Zehnder interferometer.

7. The apparatus of claim 1, wherein the coupling section is to operate as a 3 dB coupler.

8. An apparatus comprising:

first and second main waveguides forming a coupling section, with input and output sections on either side of the coupling section;

first and second side waveguide sections adjacent respective outer sides of the first and second main waveguides in the coupling section to allow evanescent coupling between the first main waveguide and the first aide waveguide section, and between the second main waveguide and the second side waveguide section; and wherein the first and second main waveguides have a first average width, the first and second side waveguide sections have a second average width, and wherein the first average width is greater than the second average width.

9. The apparatus of claim 8, wherein the coupling section is to provide 3 dB coupling.

10. The apparatus of claim 8, wherein the first and second side waveguide sections each have first and second tapered ends.

11. The apparatus of claim 8, further including a diode laser optically coupled to the first main waveguide at the input section.

12. An apparatus comprising:

first and second optical couplers formed from first and second main waveguides and having respective first and second coupling sections, the first and second optical couplers forming a Mach-Zehnder interferometer;

a first pair of side waveguide sections adjacent the first coupling section to provide evanescent coupling between the first pair of side waveguide sections and the first coupling section; and a second pair of side waveguide sections adjacent the second coupling section to provide evanescent coupling between the second pair of side waveguide sections and the second coupling section.

13. The apparatus of claim 12, further including:

a first optical fiber having first and second ends, with the first end of the first optical fiber coupled to an input end of the first main waveguide and the second end of the first optical fiber coupled to a light source.

14. The apparatus of claim 13, further including:

a second optical fiber having first and second ends, with the first cud of the second optical fiber coupled to an output end of the first main waveguide and die second end of the second optical fiber coupled to a first photodetector; and a third optical fiber having first and second ends, with the first end of the third optical fiber coupled to an output end of the second main waveguide and the second end of the third optical fiber coupled to a second photodetector.

15. The apparatus of claim 12, wherein each aide waveguide section has first and second tapered ends.

16. The apparatus of claim 12, wherein the side waveguide sections and the first and second main waveguides each include a core formed from doped silica in a cladding farmed from undoped silica.

17. A method comprising:

inputting a first lightwave into a first main waveguide of an optical coupler having a coupling section;

coupling a first portion of power from the first lightwave into a second main waveguide in the coupling section to form a second lightwave, and coupling a second portion of power from the first lightwave into a first side waveguide section adjacent the first main waveguide in the coupling section to form a third lightwave;

coupling a portion of power from the second lightwave into a second side waveguide section adjacent the second main waveguide in the coupling section to form a fourth lightwave; and coupling power from the third and fourth lightwaves back into the first and second main waveguides, respectively.

18. The method of claim 17, including outputting light from at least one of first and second output ends of the first and second main waveguides.

19. The method of claim 17, wherein the coupling of power from the third and fourth lightwaves back into the first and second main waveguides includes interacting the third and fourth lightwaves with tapered ends of the first and second side waveguides.

20. A method comprising:

forming first and second main waveguides separated by a center-to-center distance atop a substrate comprising a coupling section between input and output sections such that the first and second main waveguides are substantially parallel in the coupling section and the first main waveguide is to evanescently coupled to the second main waveguide in the coupling section; and forming first and second side waveguide sections in the coupling section adjacent respective outer sides of the first and second main waveguides such that the first main waveguide is to evanescently couple to the first side waveguide section and the second main waveguide is to evanescently couple to the second side waveguide section.

21. The method of claim 20, including forming the first and second main waveguides and the first and second side waveguide sections using the same processes so that the first and second side waveguide sections have geometry variations that correspond to geometry variations in the first and second main waveguides.

22. The method of claim 20, including forming the first and second side waveguide sections to have an average width less than an average width of the first and second main waveguide sections.

23. The method of claim 20, including forming the first and second main waveguides by forming undoped silica cladding around first and second doped silica cores.

24. The apparatus of claim 1, wherein the center-to-center distance between the first and second main waveguides in the coupling section is between 4 and 8 microns.

25. The apparatus of claim 1, wherein:

the first main waveguide is separated from the first side waveguide section by a center-to-center distance of between 3 and 6 microns in the coupling section; and the second main waveguide is separated from the second side waveguide section in the coupling section by a center-to-center distance of between 3 and 6 microns in the coupling section.

26. The method of claim 20, including forming the first and second main waveguides to be separated by a center-to-center distance of between 4 and 8 microns in the coupling section.

27. The method of claim 20, further comprising:

forming the first side waveguide section to be separated from first main waveguide by a center-to-center distance of between 3 and 6 microns in the coupling section; and forming the second side waveguide section to be separated from second main waveguide by a center-to-center distance of between 3 end 6 microns in the coupling section.

* * * * *

UNITED STATES PATENT AND TRADEMARK OFFICE
CERTIFICATE OF CORRECTION

PATENT NO. : 6,950,581 B2
DATED : September 27, 2005
INVENTOR(S) : Bandyopadhyay It is certified that error appears in the above-identified patent and that said Letters Patent is hereby corrected as shown below:

Column 7,
Line 20, delete "aide" and insert -- side --.
Line 59, delete "cud" and insert -- end --.
Line 60, delete "die" and insert -- the --.

Column 8,
Line 1, delete "aide" and insert -- side --.
Line 6, delete "farmed" and insert -- formed --.
Line 42, delete "coupled" and insert -- couple --.

Column 10,
Line 9, delete "end" and insert -- and --.

Signed and Sealed this

Fourteenth Day of February, 2006

JON W. DUDAS
*Director of the United States Patent and Trademark Office*